US008753755B2

(12) United States Patent
Konyashin et al.

(10) Patent No.: US 8,753,755 B2
(45) Date of Patent: Jun. 17, 2014

(54) BODY COMPRISING HARD FACE STRUCTURE AND METHOD FOR MAKING SAME

(75) Inventors: Igor Yuri Konyashin, Huenfeld (DE); Bernd Heinrich Ries, Huenfeld (DE); Frank Friedrich Lachmann, Burghaun (DE); Kersten Heinrich Schafer, Burghaun (DE)

(73) Assignee: Element Six GmbH, Burghaun (DE)

( * ) Notice: Subject to any disclaimer, the term of this patent is extended or adjusted under 35 U.S.C. 154(b) by 0 days.

(21) Appl. No.: 13/808,107

(22) PCT Filed: Jul. 6, 2011

(86) PCT No.: PCT/EP2011/061379
§ 371 (c)(1),
(2), (4) Date: Feb. 11, 2013

(87) PCT Pub. No.: WO2012/004292
PCT Pub. Date: Jan. 12, 2012

(65) Prior Publication Data
US 2013/0125872 A1    May 23, 2013

(30) Foreign Application Priority Data

Jul. 9, 2010   (GB) .................................... 1011583

(51) Int. Cl.
*B32B 15/04*   (2006.01)
*B32B 15/18*   (2006.01)
*C23C 8/00*    (2006.01)
*B28D 1/26*    (2006.01)
*B22F 7/00*    (2006.01)
*B22F 7/06*    (2006.01)
*B22F 7/08*    (2006.01)

(52) U.S. Cl.
USPC ........... 428/681; 428/682; 428/684; 428/687; 428/665; 125/40; 148/240; 148/320; 148/278; 148/512; 148/516; 419/10; 419/11; 419/14; 419/48

(58) Field of Classification Search
USPC .......... 428/681, 682, 683, 684, 685, 687, 665
See application file for complete search history.

(56) References Cited

U.S. PATENT DOCUMENTS

2006/0005662 A1 *  1/2006  Lockwood et al. ............. 75/240
2009/0297720 A1   12/2009  Ramgopal et al.

FOREIGN PATENT DOCUMENTS

DE     3618198 A1   12/1987
GB     2481911 B     2/2013
(Continued)

OTHER PUBLICATIONS

Combined Search Report and Examination Report dated Oct. 26, 2011 in Application No. GB1111510.2.

(Continued)

*Primary Examiner* — Michael E La Villa
(74) *Attorney, Agent, or Firm* — Dean W. Russell; Christopher M. Durkee; Kilpatrick Townsend & Stockton LLP (57) ABSTRACT

A body, such as a pick tool for cutting coal, includes a steel substrate and a hard face structure fused to the steel substrate. The hard face structure includes at least 1 weight percent Si, at least 5 weight percent Cr and at least 40 weight percent W. Substantially the balance of the hard face structure includes carbon and an iron group metal M selected from Fe, Co, Ni and alloy combinations of these elements. The hard face structure includes a plurality of elongate or platelike microstructures having a mean length of at least 1 micron, a plurality of nano-particles having a mean size of less than 200 nanometers, and a binder material.

30 Claims, 8 Drawing Sheets

(56) References Cited

FOREIGN PATENT DOCUMENTS

| | | | |
|---|---|---|---|
| WO | 2010029518 | A1 | 3/2010 |
| WO | 2010029522 | A2 | 3/2010 |
| WO | 2011128250 | A1 | 10/2011 |

OTHER PUBLICATIONS

International Search Report and Written Opinion dated Dec. 6, 2011 in Application No. PCT/EP2011/061379.

* cited by examiner

BODY COMPRISING HARD FACE STRUCTURE AND METHOD FOR MAKING SAME

CROSS REFERENCE TO RELATED APPLICATIONS

This application is the U.S. national phase of International Application No. PCT/EP2011/061379 filed on Jul. 6, 2011, and published in English on Jan. 12, 2012 as International Publication No. WO2012/004292 A1, which application claims priority to Great Britain Patent Application No. 1011583.0 filed on Jul. 9, 2010, the contents of both of which are incorporated herein by reference.

This disclosure relates generally to a hard face structure for a steel body and to a body comprising the hard face structure, and to a method for making same.

Certain components comprising steel may be subject to wear in use. International patent application publication number WO/2010/029522 discloses a wear part or tool comprising: a body containing an iron-group metal or alloy, a wear-resistant layer metallurgically bonded to a surface of the body through an intermediate layer.

German patent number 3 618 198 discloses a method of hard-facing a steel chisel tool by placing a powder comprising carbide and metal particles between a head of the tool and a mold, and arc welding the particle mixture to the tool head.

There is a need to provide wear parts comprising steel that exhibit enhanced wear behaviour and a method of making them.

Viewed from a first aspect, there can be provided a body comprising a steel substrate and a hard face structure fused to the steel substrate, in which the hard face structure comprises at least about 1 weight percent Si, at least about 5 weight percent Cr and at least about 40 weight percent W and substantially the balance of the hard face structure consisting essentially of an iron group metal M and carbon C, M being selected from Fe, Co and Ni or an alloy thereof; the hard face structure including a plurality of micro-structures, a plurality of nano-particles having a mean size of less than about 200 nanometers, and a binder material; the micro-structures comprising more than about 1 weight percent Cr and a phase having the formula $M_xW_yC_z$, where x is in the range from about 1 to about 7, y is in the range from about 1 to about 10 and z is in the range from about 1 to about 4; the nano-particles comprising more than about 20 weight percent W, the metal M and C; and the binder material comprising more than about 3 weight percent W, more than about 2 weight percent Cr, more than about 0.5 weight percent Si, the metal M and C.

Viewed from a second aspect, there can be provided a body comprising a steel substrate and a hard face structure fused to the steel substrate via an intermediate layer having a thickness of at least about 1 micron and at most about 100 microns; the intermediate layer having been formed by a process including the steel substrate adjacent to the hard face melting and inter-mixing with hard face structure material; the intermediate layer comprising dendritic or platelet-like micro-structures having the formula MxWyCz, where x is in the range from 1 to 7, y is in the range from 1 to 10 and z is in the range from 1 to 4; the micro-structures comprise more than 1 weight percent Cr and more than 0.5 weight percent Si. The intermediate layer may form by a process including diffusion and reaction between steel from the substrate and material of the hard face structure.

Various arrangements and combinations of features are envisaged for disclosed bodies and hard face structures. For example, the micro-structures may comprise at least about 0.1 weight percent Si. The micro-structures may be elongate, platelike, reticular or dendritic in form, for example. In some arrangements, the micro-structures may comprise regions that are platelike, having two major dimensions and a minor dimension, and the minor dimension defining the thickness, which may be at least about 0.5 micron or at least about 1 micron, for example. The micro-structures may have a yellow or brown colour after etching in the Murakhami reagent for a period in the range from 3 seconds to 6 seconds. The nano-particles may comprise a compound including Si, W and Fe, and may comprise at least about 0.1 weight percent Si, for example. In particular examples, the nano-particles comprise tungsten silicide and or $Si_2W$, and or more than about 0.5 weight percent Cr. Example hard face structures may have a Vickers hardness of at least about 800 HV10 or at least about 900 HV10, and or a Palmquist fracture toughness of at least about 20 MPa·m$^{1/2}$.

Viewed from a third aspect there can be provided a tool comprising a body as disclosed, for use in pavement or rock degradation. An example tool may comprise a tip comprising polycrystalline diamond material. The tool may comprise a steel holder body, the tip being disposed proximate a distal end of the steel holder body, and a hard face structure may be fused to the holder body proximate the distal end. In an example arrangement, the hard face structure may be arranged generally concentrically with a longitudinal axis passing through the tip, entirely or partly surrounding part of the holder body proximate the tip.

Viewed from a fourth aspect, there can be provided a method for making a body as disclosed, the method including contacting precursor material with a steel substrate, the precursor material comprising at least about 13 volume percent WC grains, Si in the range from about 0.1 weight percent to about 10 weight percent, and Cr in the range from about 0.1 weight percent to about 10 weight percent, and the metal M; and (the precursor material) having a liquidus temperature of at most about 1,280 degrees centigrade; heating the precursor material to a temperature of at least about 1,300 degrees centigrade for a time period controlled to allow all, or at least a sufficient amount of the precursor material to fuse with the steel substrate. The fusion of the precursor material with the steel substrate may include diffusion and or inter-mixing of steel and precursor material, and may involve a reaction between the steel and precursor material. In some examples, the precursor material may be comprised in a precursor body, precursor paste or precursor granules, which may contain diamond or cBN particles.

An example method may include forming a precursor body comprising the precursor material, the precursor body being configures to accommodate a non-planar surface of the steel substrate; disposing the precursor body against the surface and heating the precursor body to fuse it to the substrate.

Example methods for making a body as disclosed may include at least some of the following:
preparing precursor powder, for example by a process including mixing or milling, comprising at least 13 volume percent WC grains, Si in element or compound form (for example, in the form of silicon carbide or silicon-containing precursor material) in the range from 0.1 weight percent to 10 weight percent, and Cr in form of metal or chromium carbide in the range from 0.1 weight percent to 10 weight percent, and the metal M, (the precursor material) having a liquidus temperature of at most 1,280 degrees centigrade;

processing the precursor powder to form a plurality of granules comprising the precursor powder, the granules having a mean grain size of at least about 20 microns and at most about 500 microns;

heat treating the granules at a temperature of at least about 700 degrees centigrade for at least a period in the range of about 5 to 15 minutes (in one example, the granules may be annealed at a temperature of at most about 1,100 degrees centigrade for a period of at most about 5 hours);

in one particular variant of the example, the method may include further milling the granules after the heat treatment;

contacting the precursor powder in the form of powder, paste or granulate with a steel substrate and heating (simultaneously in one variant) the precursor powder to a temperature of at least about 1,150 degrees centigrade (for example, by means of a concentrated heat source such as a plasma torch, a laser beam torch or flame torch, in a flow of protective gas);

in one particular version, the method may include further heating the steel body with the hard face structure to a temperature of at least about 1,300 degrees centigrade for a time period controlled to allow all of the precursor body to react and fuse with the steel;

in one particular version, the method may include heat-treating the coated steel body to obtain the needed hardness of the steel substrate.

Disclosed example methods may have the aspect of resulting in a very effective hard face structure intimately welded onto the body, and disclosed bodies may have improved wear retardation behaviour in use.

Non-limiting example arrangements will now be described with reference to the accompanying drawings, of which.

Figure 1:
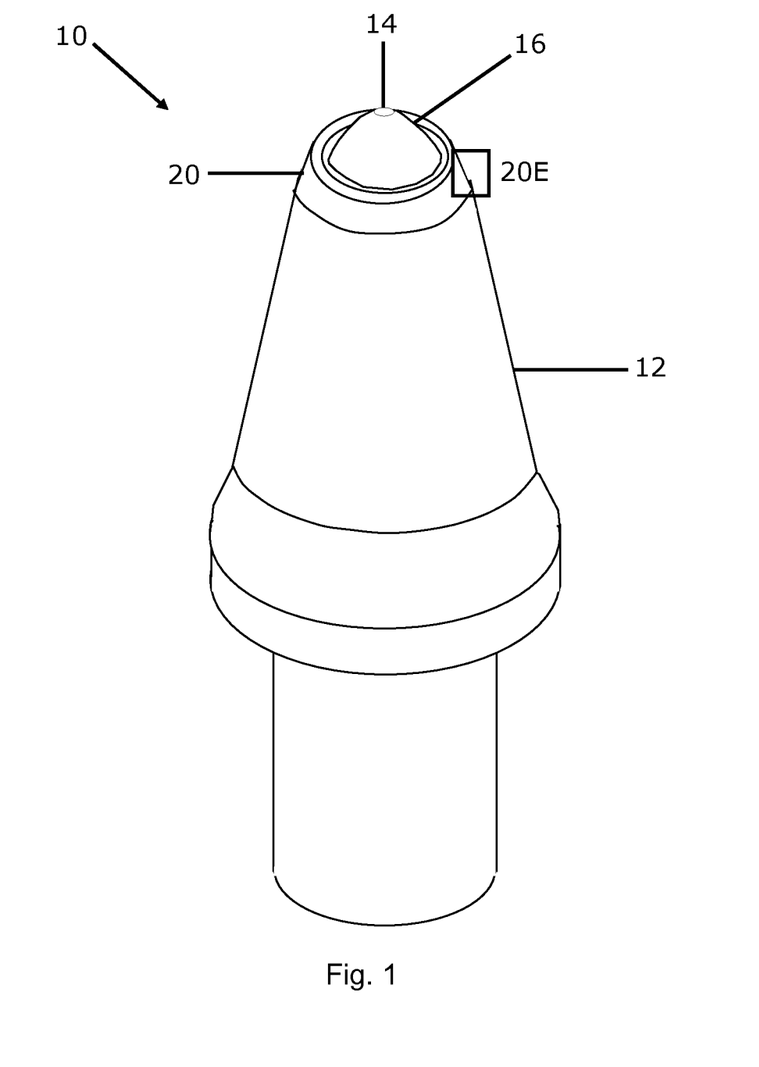
FIG. 1 shows a schematic perspective view of an example pick tool for pavement degradation.
Figure 2:
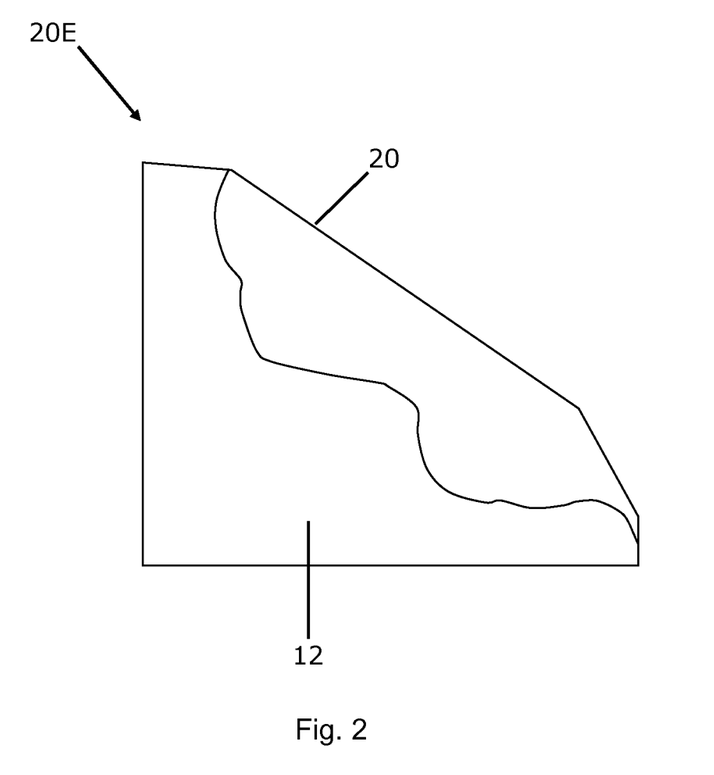
FIG. 2 shows a schematic partial cross section of an expanded portion of the example pick tool shown in FIG. 1.

With reference to FIG. 1, an example pick tool 10 for a pick tool comprise a steel substrate 12 and a hard face structure 20 fused to the steel substrate 12. The pick tool 10 may further comprise a tip 14 joined to a cemented tungsten carbide base 16, which is joined to the steel substrate 12. The hard face structure 20 is arranged around the cemented carbide base 16 to protect the steel substrate 12 from abrasive wear in use, which may involve striking the tip 14 of the tool 10 against road pavement, for example, to break up the pavement. In such use, pavement material may abrade the steel substrate 12 leading to premature failure of the pick tool 10. The tip 14 may comprise cemented carbide and or diamond material, such as polycrystalline diamond (PCD) material or silicon carbide-bonded diamond material. FIG. 2 shows an enlarged section view of region 20E in FIG. 1 through part of the hard face structure 20 and steel substrate 12 to which it is fused.

Figure 3:
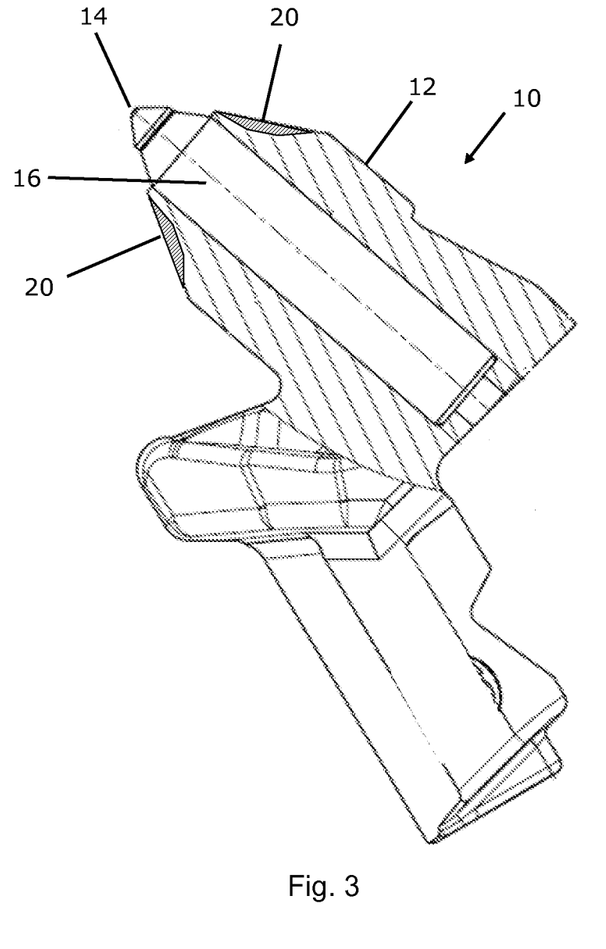
FIG. 3 shows a schematic partial cut-away side view of an example pick tool with a hard face structure fused to a portion of a steel body.

With reference to FIG. 3, an example pick tool 10 for a road pavement degradation apparatus comprises a steel holder body 12 (the steel substrate) provided with a bore, and a tip 14 joined to a cemented carbide base 16 that is shrink fit or press fit into the bore. The tip 14 is exposed proximate a forward end of the steel holder body 12 and a hard face structure 20 is fused to the steel holder body 12 at the end, arranged around the bore to protect the steel holder body 12 from wear in use. The tip 14 may comprise a PCD structure joined to a cemented tungsten carbide base 16.

Figure 4:
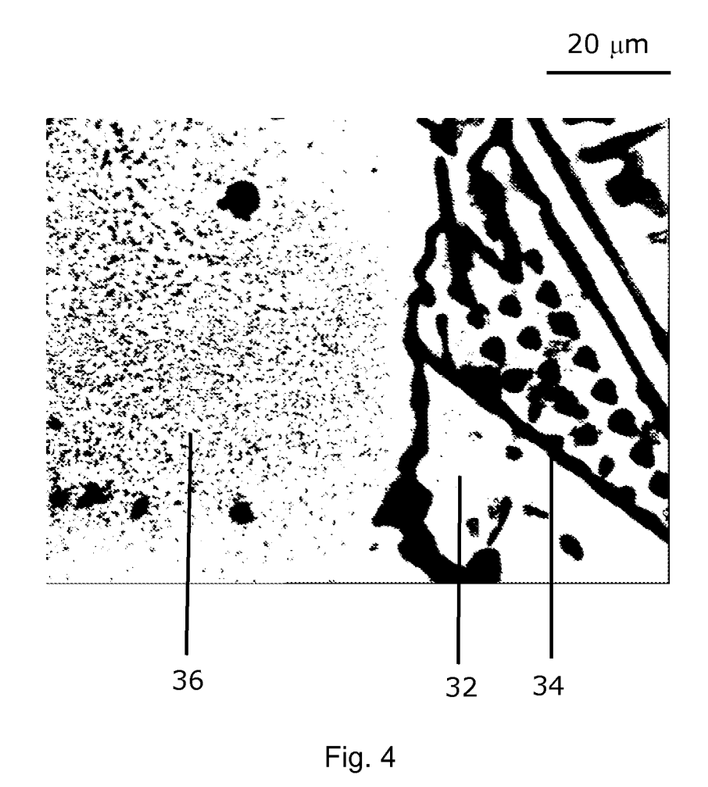
FIG. 4 and FIG. 5 show schematic images of the microstructure of example hard face structure.
Figure 5:
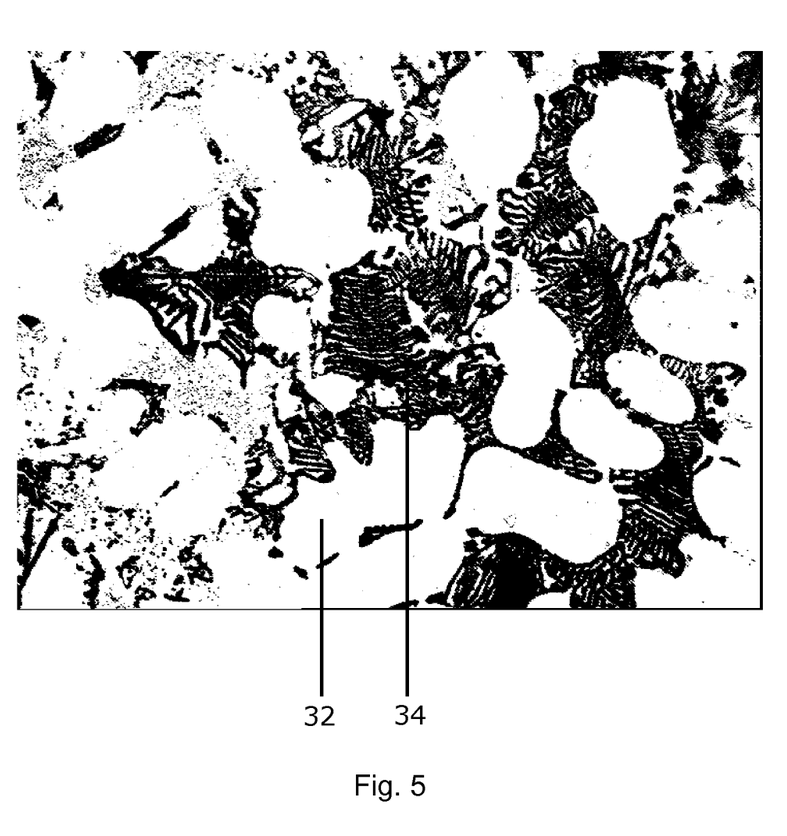

With reference to FIG. 4 and FIG. 5, an example hard face structure may comprise a plurality of dendritic micro-structures 34, a plurality of nano-particles 36, and a binder material 32.

Figure 6:
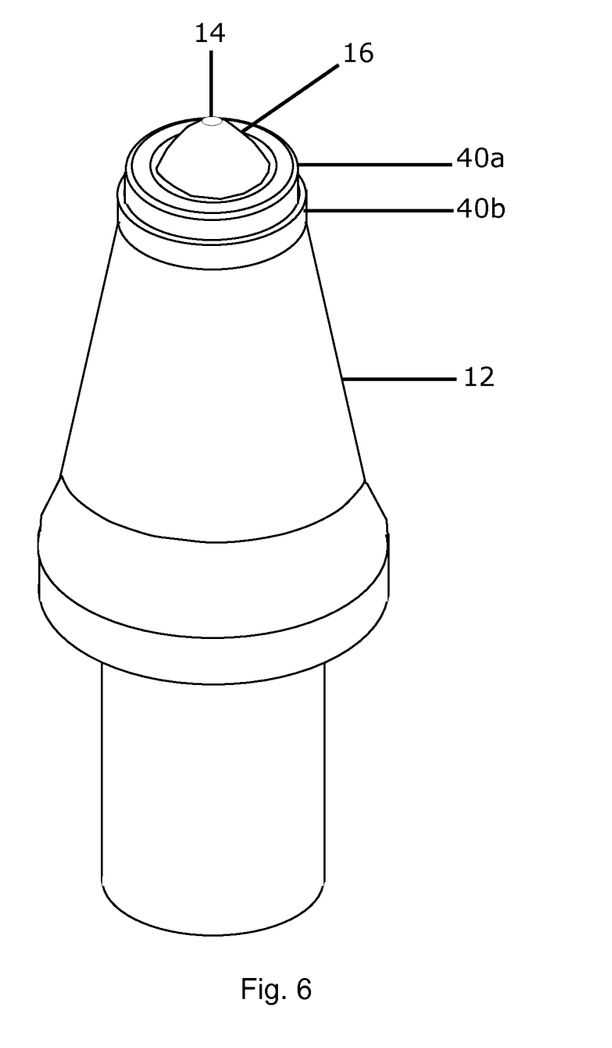
FIG. 6 shows a schematic perspective view of an example pick tool with a pair of precursor rings for producing a hard face structure fused onto the pick tool.

With reference to FIG. 6, an example hard face structure may made by a method including fusing two precursor rings 40a and 40b to a generally conical steel portion 12 of a pick tool for pavement degradation. In one particular example, the precursor rings may comprise a precursor material for a hard-metal as described in WO/2010/029518 and WO/2010/029522. The pick tool further comprises a tip 14 of polycrystalline diamond joined to a cemented tungsten carbide base 16. The precursor rings 40a and 40b have different diameters for fitting around the conical portion of the steel holder 12 (the substrate) at adjacent longitudinal positions. The precursor rings are unsintered green bodies comprising at least about 13 volume percent WC grains, Si in the range from about 0.1 weight percent to about 10 weight percent, and Or in the range from about 0.1 weight percent to about 10 weight percent. The liquidus temperature of the precursor rings is at most about 1,280 degrees centigrade. The two precursor rings 42a and 42b are placed snugly around the conical steel portion 12 and against each other, and then heated to at least about 1,300 degrees centigrade, causing them to melt and to react and fuse with the steel of the adjacent portion 12 of the steel tool body. The heating is applied for a period of time sufficient to allow a peripheral region of the precursor rings to react and fuse with the steel and to avoid complete reaction of core regions of the precursor body with the steel.

Figure 7:
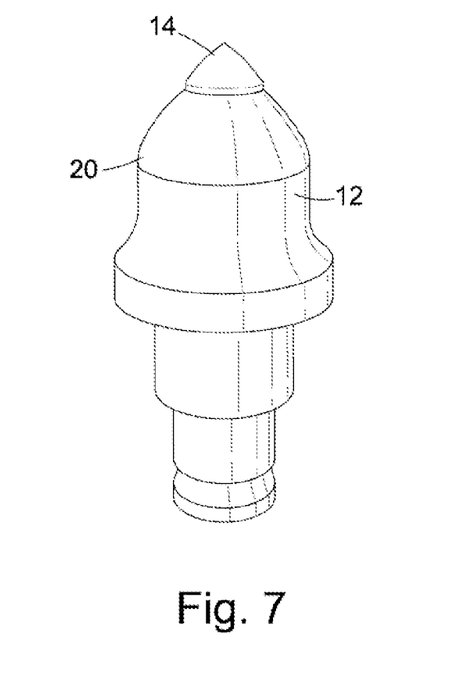
FIG. 7 and FIG. 8 show a side view photographs of example pick tools.
Figure 8:
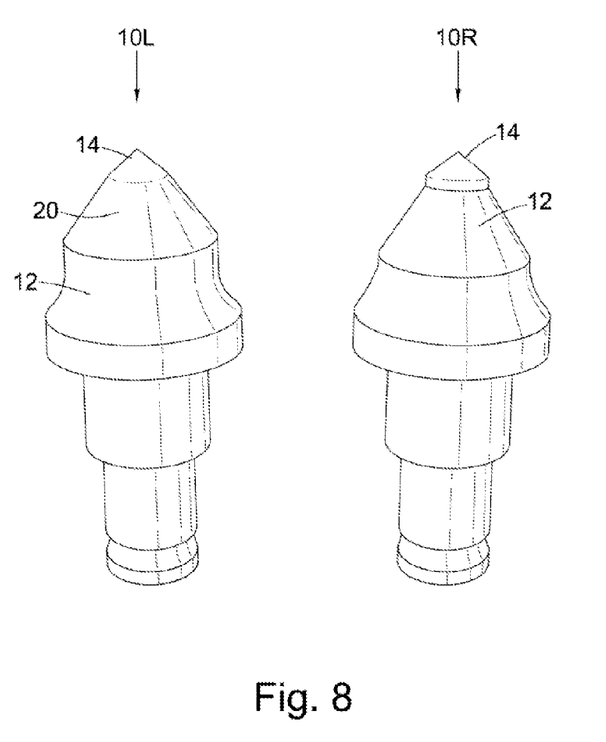

FIG. 7 shows an example of pick tool for coal-cutting, comprising a cemented carbide pick tip 14 disposed at an end of a steel holder body 12. The steel holder body 12 is coated with a layer 20 of hard facing material as described in more detail in Example 3 below. FIG. 8 shows two examples of coal-cutting picks 10L and 10R after being used to degrade formations comprising coal and sandstone. The pick 10L comprises a hard face layer 20 as described in Example 3 and the reference pick 10R did not have hard face layer. A substantially amount of the steel material had been worn from the reference pick 10R during the test.

Non-limiting example arrangements are described in more detail below.

EXAMPLE 1

A 1 kg batch of powders comprising 62.7 weight percent WC powder with a mean diameter of about 2.5 microns, 25 weight percent Fe powder, 10 weight percent $Cr_3C_2$ powder and 2.3 weight percent Si powder was milled for about one hour in an attritor mill in a medium of hexane with 6 kg hard-metal balls. After milling, the resulting slurry was dried and the powder was screened to eliminate agglomerates. The resulting powder was mixed with 12 weight percent organic binder and the paste obtained thus was applied onto the surface of steel substrates (carbon steel, ST50). The substrates with a layer of the paste were heat-treated in vacuum at a temperature of 1,350 degree centigrade for about one hour in a vacuum furnace to form a continuous coating of roughly 2 mm in thickness on the steel substrate. The coated steel substrates were heat-treated by use of a conventional procedure for heat-treating steels. The HV10 hardness of the coating was found to be 1,050 and its Palmquist fracture toughness to be 21.4 MPa·m$^{1/2}$.

The micro-structure of the hard-facing structure exhibited dendridic crystals of eta-phase ($Fe_3W_3C$), nano-particles in form of nano-plates, nano-rods or nano-spheres and a binder based on Fe. The composition of the dendridic crystals as measured by EDX was as follows 58 weight percent W, 0.2 weight percent Si and 1.4 weight percent Cr, the remainder consisting essentially of Fe and C. The composition of the binder as measured by EDX was as follows: 4.8 weight percent W, 2.5 weight percent Cr, 1.0 weight percent Si, the remainder consisting essentially of Fe and C. After etching the metallurgical cross-section in the Murakhami solution for 4 seconds, the dendridic crystals had a yellow colour.

The coated steel substrates were tested by use of the ASTM G65-04 test to measure wear resistance. Uncoated steel substrates were used as controls. The mass loss due to abrasion of the control was about 820 mg and that of the coated steel substrate was about 80 mg. The volume loss of the uncoated steel was 105.2 mm$^3$ and that of the coated steel was 11.1 mm$^3$, indicating that the wear resistance of the coated steel samples was nearly 10 times higher than that of the steel substrate.

EXAMPLE 2

Powder for making a hard facing layer was produced as described in Example 1, mixed with 14 wt. % organic binder KD2837/6 (Szchimmer & Scharz™) and applied to steel substrates comprising carbon steel ST50. The coated steel substrates were dried at 100 degrees centigrade for 2 hours and the coating in the green (i.e. unsintered) state was melted in a plasma torch in an Ar gas flow. The coating thus obtained had a thickness of nearly 2 mm, a microstructure similar to that of the hard face coating of Example 1 and an HV10 Vickers hardness of nearly 1,020. The coated steel substrates were tested by use of the ASTM G65-04 test. The mass loss of the coating was 10.1 mm$^3$, indicating that the wear-resistance of the coating was more than 10 times higher than that of the steel substrate.

EXAMPLE 3

Powder for making a hard facing layer was produced as described in Example 1, except that Ni powder was substituted for the Fe powder and 2 weight percent paraffin wax was added. The powder thus obtained was granulated to obtain granulates of about 100 microns to 200 microns by means of rolling in a steel drum at a temperature of 75 degrees centigrade, and heat-treated in a vacuum at 1,100 degrees centigrade for 2 hours. The plurality of granules thus obtained was applied to a steel pick holder body by means of atmospheric laser spraying, using a laser torch operated at a power of 4 kW in an Ar gas flow. The coating thus obtained had a density of about 100% of the theoretical density, was completely melted, had a microstructure similar to that of the coating according to Example 1 and an HV10 Vickers hardness of about 850. The example pick, which is shown in FIG. 7, and a non-coated reference pick were tested by using them to degrade a rock formation comprising coal and sandstone. FIG. 8 clearly indicates that the steel body of the reference pick was severely worn out after the test, whereas the wear of the example coated pick body was very insignificant.

Certain terms and concepts as used herein are briefly explained below.

A hard face structure includes but is not limited to, a layer joined to a substrate to protect the substrate from wear. The hard face structure exhibits a substantially greater wear resistance than does the substrate.

As used herein, the word "tool" is understood to mean "tool or component for a tool". Pick tools may be used for breaking, degrading or boring into bodies, such as rock, asphalt, coal or concrete, for example, and may be used in applications such as mining, construction and road reconditioning. In some applications, for example road reconditioning, a plurality of pick tools may be mounted on a rotatable drum and driven against the body to be degraded as the drum is rotated against the body. Pick tools may comprise a working tip of a superhard material, for example polycrystalline diamond (PCD), which comprises a mass of substantially inter-grown diamond grains forming a skeletal mass defining interstices between the diamond grains.

A wear part is a part or component that is subjected, or intended to be subjected to wearing stress in application. There are various kinds of wearing stress to which wear parts may typically be subjected such as abrasion, erosion, corrosion and other forms of chemical wear. Wear parts may comprise any of a wide variety of materials, depending on the nature and intensity of wear that the wear part is expected to endure and constraints of cost, size and mass. For example, cemented tungsten carbide is highly resistant to abrasion but due to its high density and cost is typically used only as the primary constituent of relatively small parts, such as drill bit inserts, chisels, cutting tips and the like. Larger wear parts may be used in excavation, drill bit bodies, hoppers and carriers of abrasive materials and are typically made of hard steels which are much more economical than cemented carbides in certain applications.

A hardmetal is a material comprising grains of metal carbide such as WC dispersed within a metal binder, particularly a binder comprising cobalt. The content of the metal carbide grains is at least about 50 weight percent of the material.

PCD material typically comprises at least about 80 volume percent of diamond and may be made by subjecting an aggregated mass of diamond grains to an ultra-high pressure of greater than about 5 GPa, for example, and a temperature of at least about 1,200 degrees centigrade, for example.

The invention claimed is:

1. A body comprising a steel substrate and a hard face structure fused to the steel substrate, in which the hard face structure comprises at least 1 weight percent Si, at least 5 weight percent Cr and at least 40 weight percent W and substantially the balance of the hard face structure consisting essentially of an iron group metal M and carbon C, M being selected from the group consisting of Fe, Co, Ni and alloy combinations of these elements; the hard face structure including a plurality of elongate micro-structures having a mean length of at least 1 micron, a plurality of nano-particles having a mean size of less than 200 nanometers, and a binder material; the micro-structures comprising more than 1 weight percent Cr and a phase having the formula $M_xW_yC_z$, where x is in the range from 1 to 7, y is in the range from 1 to 10 and z is in the range from 1 to 4; the nano-particles comprising more than 20 weight percent W, the metal M, and C; and the binder material comprising more than 3 weight percent W, more than 2 weight percent Cr, more than 0.5 weight percent Si, the metal M and C.

2. A body as claimed in claim 1, in which the micro-structures comprise regions that are plate-like, having two major dimensions and a minor dimension, the minor dimension defining the thickness and the thickness being at least 0.5 micron.

3. A body as claimed in claim 1, in which the micro-structures comprise at least 0.1 weight percent Si.

4. A body as claimed in claim 1, in which the nano-particles comprise at least 0.1 weight percent Si.

5. A body as claimed in claim 1, in which the hard face structure comprises grains of tungsten carbide of 0.5 to 100 microns.

6. A body as claimed in claim 1, in which the nano-particles comprise at least 0.5 weight percent Cr.

7. A body as claimed claim 1, in which the nano-particles comprise a compound including Si, W and Fe.

8. A body as claimed in claim 1, in which the nano-particles comprise tungsten silicide.

9. A body as claimed in claim 1, in which the nano-particles comprise $Si_2W$.

10. A body as claimed in claim 1, in which the micro-structures are dendritic in form.

11. A body as claimed in claim 1, in which the micro-structures have a yellow or brown colour after etching in the Murakhami reagent for a period in the range from 3 seconds to 6 seconds.

12. A body as claimed in claim 1, in which the hard face structure has Vickers hardness of at least 800 HV10.

13. A body as claimed in claim 1, in which the hard face structure has a Palmquist fracture toughness of at least 20 $MPa \cdot m^{1/2}$.

14. A body as claimed in claim 1, comprising a steel substrate and a hard face structure fused to the steel substrate via an intermediate layer having a thickness of at least 1 micron and at most 100 microns; the intermediate layer having been formed by a process including the steel substrate adjacent to the hard face melting and inter-mixing with hard face structure material; the intermediate layer comprising dendritic micro-structures having the formula $M_xW_yC_z$, where M is selected from the group consisting of Fe, Co, Ni and alloy combinations of these elements and where x is in the range from 1 to 7, y is in the range from 1 to 10 and z is in the range from 1 to 4; and wherein the dendritic micro-structures comprise more than 1 weight percent Cr and more than 0.5 weight percent Si.

15. A body as claimed in claim 2, comprising a steel substrate and a hard face structure fused to the steel substrate via an intermediate layer having a thickness of at least 1 micron and at most 100 microns; the intermediate layer having been formed by a process including the steel substrate adjacent to the hard face melting and inter-mixing with hard face structure material; the intermediate layer comprising platelet-like micro-structures having the formula $M_xW_yC_z$, where M is selected from the group consisting of Fe, Co, Ni and alloy combinations of these elements and where x is in the range from 1 to 7, y is in the range from 1 to 10 and z is in the range from 1 to 4; and wherein the platelet-like micro-structures comprise more than 1 weight percent Cr and more than 0.5 weight percent Si.

16. A tool comprising a body as claimed in claim 1, for use in pavement or rock degradation.

17. A tool as claimed in claim 16, comprising a tip comprising polycrystalline diamond material.

18. A method for making a body as claimed in claim 1, the method including contacting precursor material with a steel substrate, the precursor material comprising WC grains, Si in the range from 0.1 weight percent to 10 weight percent, and Cr in the range from 0.1 weight percent to 10 weight percent, and the metal M; and having a liquidus temperature of at most 1,280 degrees Celsius; heating the precursor material to a temperature of at least 1,300 degrees Celsius for a time period controlled to allow the precursor material to react and fuse with the steel.

19. A method as claimed in claim 18, including preparing the precursor material by combining WC grains, Si in elemental or compound form in the range from 0.1 weight percent to 10 weight percent, and Cr in form of metal or chromium carbide in the range from 0.1 weight percent to 10 weight percent, and the metal M, and the precursor material having a liquidus temperature of at most 1,280 degrees Celsius; processing the precursor material to form a plurality of granules comprising the precursor material, the granules having a mean grain size of at least 20 microns and at most 500 microns; heat treating the granules at a temperature of at least 700 degrees Celsius for at least about 5 minutes; contacting the granules with a steel substrate and heating the granules to a temperature of at least 1,150 degrees Celsius.

20. A method as claimed in claim 18, in which the precursor material contains diamond particles.

21. A method as claimed in claim 18, the method including forming a precursor body comprising the precursor material, the precursor body being configured to accommodate the shape of a non-planar surface of the steel substrate; disposing the precursor body against the non-planar surface and heating the precursor body to fuse it with the substrate.

22. A body comprising a steel substrate and a hard face structure fused to the steel substrate, in which the hard face structure comprises at least 1 weight percent Si, at least 5 weight percent Cr and at least 40 weight percent W and substantially the balance of the hard face structure consisting essentially of an iron group metal M and carbon C, M being selected from the group consisting of Fe, Co, Ni and alloy combinations of these elements; the hard face structure including a plurality of platelike micro-structures having a mean length of at least 1 micron, a plurality of nano-particles having a mean size of less than 200 nanometers, and a binder material; the micro-structures comprising more than 1 weight percent Cr and a phase having the formula $M_xW_yC_z$, where x is in the range from 1 to 7, y is in the range from 1 to 10 and z is in the range from 1 to 4; the nano-particles comprising more than 20 weight percent W, the metal M, and C; and the binder material comprising more than 3 weight percent W, more than 2 weight percent Cr, more than 0.5 weight percent Si, the metal M and C.

23. A body as claimed in claim 22, in which the micro-structures comprise at least 0.1 weight percent Si.

24. A body as claimed in claim 22, in which the nano-particles comprise at least 0.1 weight percent Si.

25. A body as claimed in claim 22, in which the hard face structure comprises grains of tungsten carbide of 0.5 to 100 microns.

26. A body as claimed in claim 22, in which the nano-particles comprise at least 0.5 weight percent Cr.

27. A body as claimed claim 22, in which the nano-particles comprise a compound including Si, W and Fe.

28. A body as claimed in claim 22, in which the nano-particles comprise tungsten silicide.

29. A body as claimed in claim 22, in which the nano-particles comprise $Si_2W$.

30. A body as claimed in claim 22, in which the micro-structures are dendritic in form.

* * * * *